United States Patent [19]

Sovacool et al.

[11] Patent Number: 4,638,964
[45] Date of Patent: Jan. 27, 1987

[54] GROMMET ASSEMBLY

[75] Inventors: David K. Sovacool, Cortland; Allan S. Van Slyke, Southington; Edward M. Bungo, Cortland, all of Ohio

[73] Assignee: General Motors Corporation, Detroit, Mich.

[21] Appl. No.: 796,198

[22] Filed: Nov. 8, 1985

[51] Int. Cl.[4] ............................................. F16L 5/00
[52] U.S. Cl. ................................. 248/56; 174/152 G; 16/2
[58] Field of Search ..................... 16/2; 174/152 G; 248/56; 339/103 B, 104

[56] References Cited

U.S. PATENT DOCUMENTS

| | | | |
|---|---|---|---|
| 4,190,222 | 2/1980 | Appleton et al. | 248/56 |
| 4,272,645 | 6/1981 | Kornatowski | 174/65 G |
| 4,289,924 | 9/1981 | Pearce, Jr. et al. | 174/152 G |
| 4,407,042 | 10/1983 | Schramme et al. | 16/2 |
| 4,487,998 | 12/1984 | Pegram | 174/153 G |

Primary Examiner—Donald R. Schran
Assistant Examiner—James L. Wolfe
Attorney, Agent, or Firm—Patrick M. Griffin

[57] ABSTRACT

A grommet assembly for attachment to an apertured panel within a limited access space around the aperture for passing a wire bundle through the aperture. The grommet body includes a pivot support extending therefrom and offset to one side thereof when the grommet body is placed in an attachment position overlying the panel aperture. A peripheral stop flange of the grommet body engageable with one surface of the panel defines an attachement envelope within that limited access space. A retainer includes a pivot member by which the retainer is pivotally joined to the pivot support to rotate toward the grommet body. At an operative position, a stop portion of the retainer engages the other surface of the panel, and the retainer is sized so as to stay within the attachment envelopes it rotates. A locking means maintains the retainer in that operative position, thereby attaching the grommet assembly to the panel within the limited access space.

3 Claims, 7 Drawing Figures

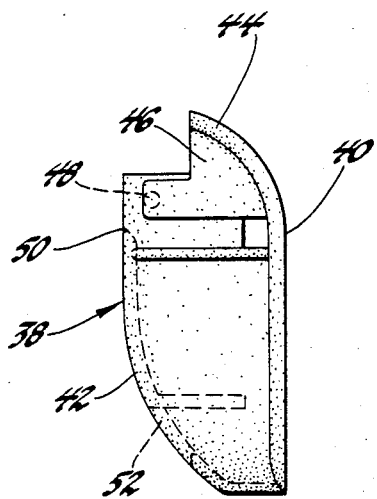
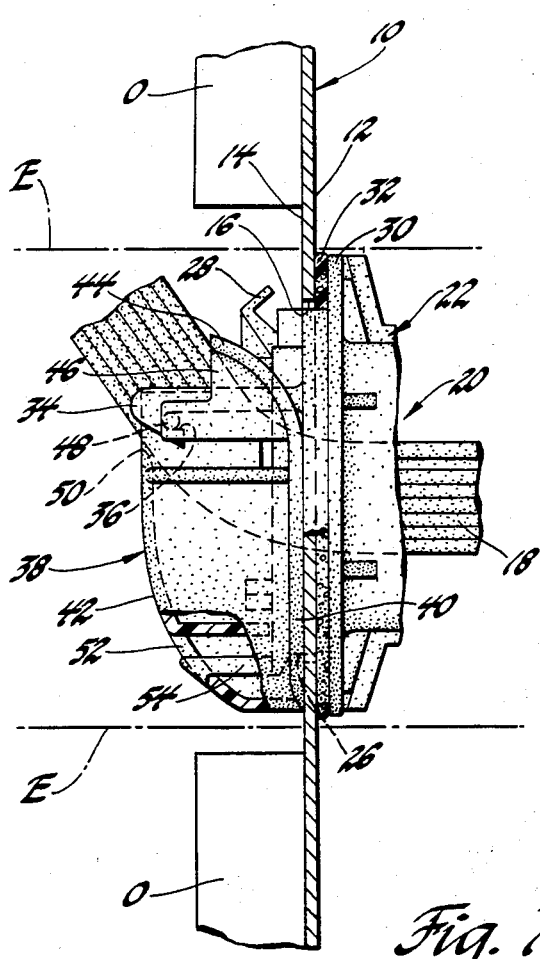
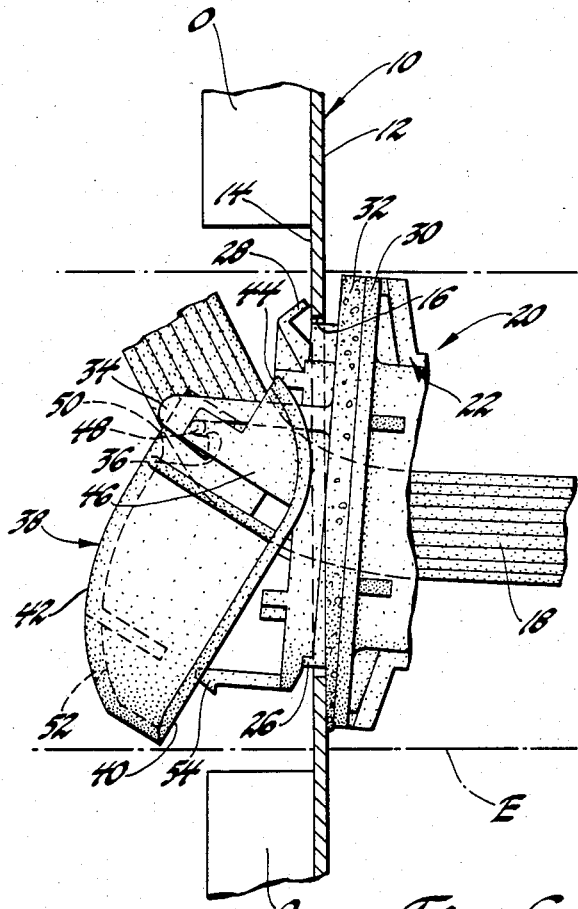

GROMMET ASSEMBLY

FIELD OF THE INVENTION

This invention relates to grommet assemblies for passing a wire bundle through an aperture in a panel, and specifically to such an assembly that is attachable to the panel within a limited access space around the panel aperture.

BACKGROUND OF THE INVENTION

Grommet assemblies are often used to pass a wire bundle through an aperture in a panel. In the automotive industry, wire bundles must often be passed through the bulkhead panel of a vehicle as it is being wired. A grommet assembly is desirable to protect the bundle from the sharp edges of the aperture through the sheet metal of the bulkhead panel. A common known grommet is a simple flexible cylindrical rubber member designed to pop fit through an aperture with a wire or a small wire bundle passing therethrough. In modern vehicles, however, such simple grommets are often unsuitable, as it is necessary to protect and support much larger and heavier wire bundles. Consequently, the trend is toward heavier grommet assemblies, often known as hardshell grommet assemblies, that are larger and capable of handling and accurately locating the larger wire bundles. These hardshell grommet assemblies generally include a grommet body with a passage through which the wire bundle extends, and may also provide for injecting a sealant material into the passage around the wire bundle. Some means is necessary to attach the heavier grommet body to the bulkhead panel overlying the aperture, as a pop fit will generally be insufficiently strong. Various means for attaching a hardshell grommet assembly are disclosed in patents assigned to the assignee of the present invention. U.S. Pat. No. 4,289,924 to Pearce et al shows a hardshell grommet assembly 10 that is attached to a bulkhead panel 14 overlying an aperture 12 by bolts or other fasteners that pass through holes in the bulkhead panel 14. An improved means for attaching a grommet assembly that requires no fasteners passing through the bulkhead panel is disclosed in U.S. Pat. No. 4,407,042 to Schramme et al. There, a grommet assembly 10 has a shank 38 that is inserted through the bulkhead panel aperture. Then, a U-shaped retainer 22 is pushed in from the side into tapered slots 54 in the shank 38 to attach and retain the grommet assembly 10. This assembly works well where there is enough access space around the perimeter of the bulkhead panel aperture to in fact allow the retainer to be used. However, the available access space may be limited by the presence of obstructions or other structures already attached to the bulkhead panel, rendering such a retainer unusable.

SUMMARY OF THE INVENTION

The invention provides a grommet assembly that can be used where access space is limited. A bulkhead panel with opposed surfaces and an aperture therethrough has obstructions thereon that limit the space available around the aperture for attaching a grommet assembly. The grommet assembly of the invention includes a grommet body and a retainer that work cooperatively within that limited access space. The grommet body has a passage through which a wire bundle may extend. The grommet body also has a stop portion in the form of a peripheral stop flange that is engageable with one surface of the bulkhead panel around the aperture when the grommet body is placed in an attachment position overlying the aperture with the wire bundle passing through the aperture. The grommet body stop flange is engageable with the one bulkhead panel surface indirectly through a resilient gasket located between the stop flange and the one surface of bulkhead panel. When it is in the attachment position, the grommet body peripheral stop flange defines an attachment envelope that is within the limited access space, and within which the retainer operates.

The grommet body also has a pivot support which, in the preferred embodiment, includes a pair of spaced legs extending from the grommet body and offset to one side thereof. Though offset, the spaced legs are still able to pass through the aperture as the grommet body is placed in the attachment position, and the wire bundle can pass between the spaced legs. Each spaced leg also includes a surface that faces the other surface of the bulkhead panel.

The retainer has at least one pivot member by which the retainer may be pivotally joined to the pivot support when the grommet body is in the attachment position. The retainer is so pivotally joined by a pair of spaced pivot members engageable with the panel-facing surfaces of the spaced legs. The retainer may then be rotated toward the grommet body until a stop portion on the retainer engages the other surface of the bulkhead panel to define an operative position of the retainer. The retainer is sized so that it remains substantially within the attachment envelope as it rotates to the operative position. In addition, the retainer includes a support member that extends between the spaced pivot members and which is located so as to supportingly engage the wire bundle as the retainer rotates to the operative position. Furthermore, in the preferred embodiment, the retainer also includes a camming member that is cammingly engageable with the bulkhead panel other surface as the retainer rotates to the operative position. The camming member biases the retainer pivot members against the surfaces of the spaced legs so as to force the grommet body stop flange and the retainer stop portion toward one another and into engagement with their respective bulkhead panel surfaces. The action of the camming member also compresses the resilient gasket between the stop flange and the one surface of the bulkhead panel to provide a seal between the grommet body and the aperture.

The grommet assembly of the invention also includes a locking means that maintains the retainer at the operative position. The locking means thereby maintains the grommet body stop flange and retainer stop portions engaged with their respective bulkhead panel surfaces. Thus, the grommet assembly is attached to the panel within the limited access space. Furthermore, the locking means also maintains the seal of the compressed resilient gasket and maintains the support member in supporting engagement with the wire bundle.

It is, therefore, an object of the invention to provide a grommet assembly for passing a wire bundle through an aperture in a panel having opposed surfaces, a grommet assembly in which the assembly is attachable to the panel within a limited access space around the aperture, and which includes a grommet body that has a passage through which the wire bundle may extend and which also has a stop portion that engages one surface of the panel when the grommet body is placed in an attachment position overlying the aperture with the wire bundle passing through the aperture, in which attachment position the periphery of the grommet body defines an attachment envelope within the limited access space, the grommet body also including a pivot support extending therefrom and offset to one side thereof while still being able to pass through the aperture as the grommet body is placed in the attachment position, and which also includes a retainer that has at least one pivot member by which the retainer can be pivotally joined to the pivot support when the grommet body is in the attachment position so as to be rotatable toward the grommet body, the retainer also including a stop portion that is engageable with the other surface of the panel as the retainer rotates to an operative position, and in which the retainer is also sized so as to remain substantially within the attachment envelope as the retainer rotates to the operative position, and which includes locking means to maintain the retainer at the operative rotated position with the grommet body and retainer stop portions engaged with their respective panel surfaces, thereby attaching the grommet assembly to the panel within the limited access space.

It is another object of the invention to provide a grommet assembly of the type described in which the pivot support includes a pair of spaced legs extending from the grommet body and offset to one side thereof while still being able to pass through the panel aperture as the grommet body is placed in the attachment position with the wire bundle passing between the spaced legs, and in which the retainer includes a pair of spaced pivot members by which the retainer may be pivotally joined to the spaced legs when the grommet body is in the attachment position so as to be rotatable toward the grommet body to an operative position, and in which the retainer further includes a support member extending between the spaced pivot members and located so as to supportingly engage the wire bundle as the retainer is rotated to the operative position and maintained there by the locking means.

It is yet another object of the invention to provide a grommet assembly of the type described in which the grommet body has a peripheral stop flange that is engageable with one surface of the panel around the aperture when the grommet body is placed in the attachment position with a resilient gasket located between the stop flange and the one surface of the panel, and in which the the pivot support extending from the grommet body also includes a surface facing the panel other surface when the grommet body is in the attachment position, and in which the retainer includes a pivot member engageable with the pivot support surface to pivotally join the retainer to the pivot support when the grommet body is in the attachment position, and in which a camming member on the retainer cammingly engages the panel other surface as the retainer rotates to the operative position to bias the retainer pivot member against the pivot support surface and force the grommet body stop flange and the retainer stop portion toward one another to compress the resilient gasket and provide a seal between the grommet body and the aperture as the retainer is rotated to the operative position and maintained there by the locking means.

DESCRIPTION OF THE PREFERRED EMBODIMENT

These and other objects and advantages of the invention will appear from the following written description and drawings in which:

FIG. 5 is a side view of the retainer;

FIG. 6 is a view similar to FIG. 1, but showing the retainer pivotally joined to the grommet body;

FIG. 7 is a view similar to FIG. 6, but showing the retainer rotated to an operative position and locked.

Figure 1:
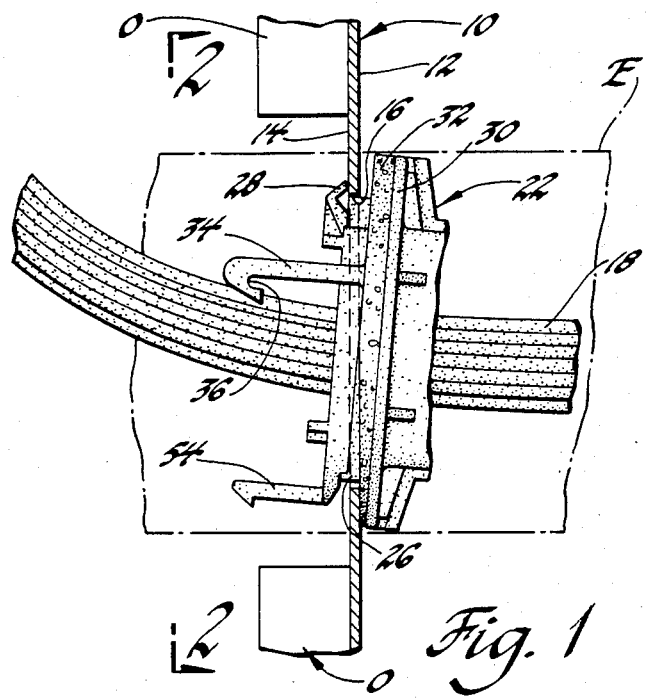
FIG. 1 is a cross sectional view through an aperture in a bulkhead panel showing a grommet body of the grommet assembly of the invention in an attachment position.
Figure 2:
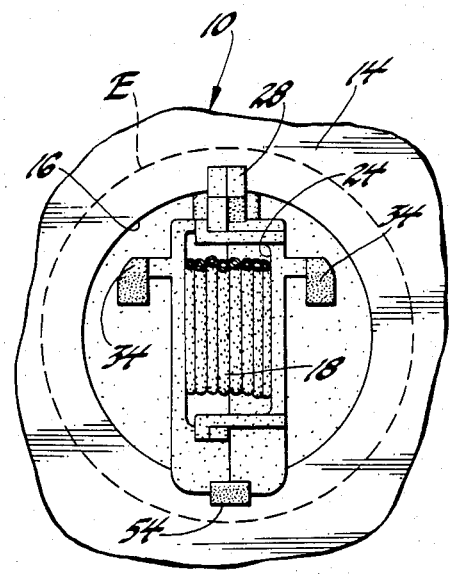
FIG. 2 is a view from the perspective of line 2—2 of FIG. 1.

Referring first to FIGS. 1 and 2, a bulkhead panel designated generally at 10 is formed of generally planar sheet metal with opposed surfaces 12 and 14. Bulkhead panel 10 includes a generally circular aperture 16, best visible in FIG. 2, through which a wire bundle 18 is passed. The access space around aperture 16 that is available to attach any grommet assembly is limited, as by obstructing structures already mounted to bulkhead panel 10 and designated generally at O in FIG. 1. The invention provides a grommet assembly that is attachable to bulkhead panel 10 to pass wire bundle 18 through aperture 16 in spite of the limited access space.

Referring next to FIG. 7, the grommet assembly of the invention is designated generally at 20 and is shown after it has been attached to bulkhead panel 10. Referring back to FIGS. 1 and 2, grommet assembly 20 includes a grommet body, designated generally at 22, which is shown partially broken away. Grommet body 22 has a generally central passage 24 through which wire bundle 18 extends. One of the primary purposes of grommet body 22 is to protect wire bundle 18 from the edges of aperture 16 as it passes wire bundle 18 therethrough. Additionally, grommet body 22 may be of the injectable type, with wire bundle 18 being held fast within passage 24 by a suitable injected sealant, not illustrated, that also seals passage 24. As shown in FIG. 1, grommet body 22 is in what may be called an attachment position overlying aperture 16. Grommet body 22 is placed in the attachment position by initially pulling wire bundle 18 through aperture 16 from the surface 12 side of bulkhead panel 10. Then, a notch 26 is seated over the bottom edge of aperture 16, with grommet body 22 spaced away from bulkhead panel surface 12. Next, grommet body 22 is pushed to the FIG. 1 position, and a flexible finger 28 snaps past the upper edge of aperture 16, which it has already done in FIG. 1. Finger 28 retains grommet body 22 in the attachment position until the attachment of grommet assembly 20 is carried out.

Still referring to FIGS. 1 and 2, grommet body 22 also includes a stop portion in the form of a circular peripheral stop flange 30 that is engageable with bulkhead panel surface 12 around the aperture 16 when grommet body 22 is in the attachment position. In the preferred embodiment, stop flange 30 indirectly engages bulkhead panel surface 12 through a compressible resilient gasket 32 located between stop flange 30 and surface 12. As shown in FIG. 1, stop flange 30 is partially engaged with surface 12, and gasket 32 is partially compressed. Grommet body 22 also includes a pivot support in the form of a pair of spaced legs 34 extending from grommet body 22 through aperture 16, each of which includes a concave surface 36 that faces and is spaced from bulkhead panel surface 14. Spaced legs 34 are offset to the upper side of grommet body 22, as may be best seen in FIG. 2. The offset of spaced legs 34 is intended to be as far from the center of grommet body 22 as is feasible, while still allowing the spaced legs 34 to pass without interference through aperture 16 when grommet body 22 is placed in the attachment position of FIG. 1, as described above. It will also be apparent from FIG. 1 that wire bundle 18 passes generally between spaced legs 34. When grommet body 22 is in the attachment position, the circular peripheral stop flange 30 may be thought of as defining an imaginary cylindrical attachment envelope, designated at E, which is within the limited access space discussed above. The grommet assembly 20 of the invention may be attached to bulkhead panel 10 by a means that operates substantially within that attachment envelope E, as will be described below.

Figure 3:
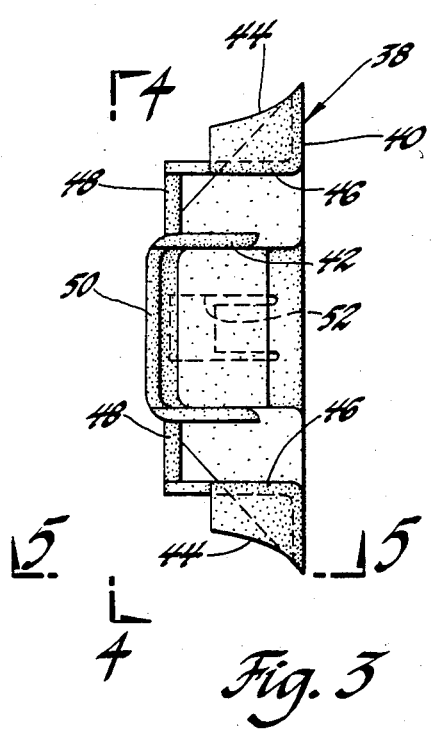
FIG. 3 is an end view of the retainer of the grommet assembly of the invention.
Figure 4:
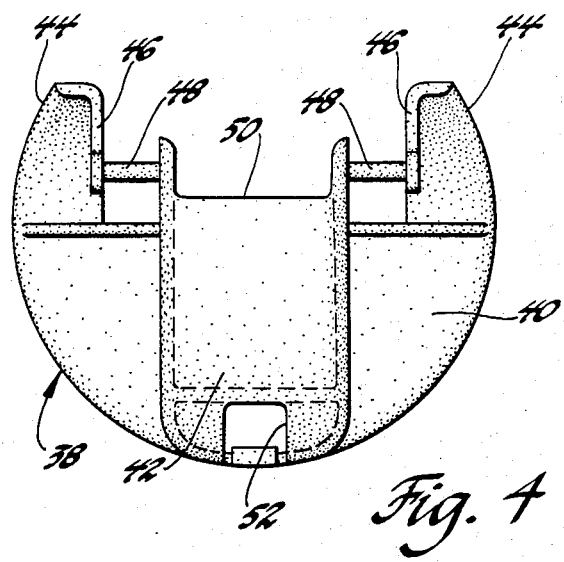
FIG. 4 is a plan view of the retainer.

Referring next to FIGS. 3 through 5, the grommet assembly 20 of the invention is attached to bulkhead panel 10 by a retainer, designated generally at 38, molded as one piece out of plastic or other suitable material. The basic structure of retainer 38 includes a substantially flat base 40 and a central body portion 42 that is generally normal to base 40 and generally U-shaped in cross section. Base 40 is curved up at two locations to form a pair of camming members 44, as best seen in FIG. 5. A pair of support struts 46 integral with the camming members 44 extend generally normal to base 40, outboard of and spaced from the sides of the body portion 42. A pair of pivot members are provided by a pair of coaxial pivot pins 48 which are molded between the support struts 46 and the sides of central body portion 42, as best seen in FIG. 4. Pivot pins 48 are spaced from each other by approximately the same spacing as the spaced legs 34 of grommet body 22. Pivot pins 48 are also spaced from base 40, as best seen in FIG. 3, by a distance that allows the camming members 44 to operate. It will also be noted that an edge 50 of body portion 42 extends generally between pivot pins 48. As seen in FIG. 5, edge 50 is also spaced from base 40, a location which allows it to supportingly engage wire bundle 18. Finally, a locking means for retainer 38 includes a generally square window 52 molded through body portion 42, and a flexible hook 54 on grommet body 22, best seen in FIG. 1. The operation of camming members 44, edge 50, and the locking means will be best understood by referring to the description of the actual attachment of grommet assembly 20, described below.

The attachment of grommet assembly 20 is shown in FIGS. 6 and 7. Referring first to FIG. 6, with grommet body 22 in the attachment position, the pivot pins 48 are snapped into the concave surfaces 36, thereby pivotally joining retainer 38 to the spaced legs 34 so that it may be rotated counterclockwise toward the grommet body 22. The pivot pins 48 are spaced sufficiently from retainer base 40 so that, as retainer 38 rotates, the camming members 44 begin to cammingly engage bulkhead panel surface 14. Therefore, as retainer 38 continues to rotate, the engagement of camming members 44 with surface 14 will bias the pivot pins 48 out against the concave surfaces 36, which forces the grommet body stop flange 30 and the retainer base 40 toward one another. Concurrently, the resilient gasket 32 is further compressed between stop flange 30 and bulkhead panel surface 12, and provides a seal between grommet body 22 and aperture 16. An operator may gain a mechanical advantage in compressing resilient gasket 32 by pushing on the most peripheral portion of retainer 38, which is near the window 52. The lever arm of that mechanical advantage, measured from the spaced legs 34 to the peripheral portion of retainer 38, is maximized by offsetting spaced legs 34 from the center of grommet body 22 as far as possible, as described above. The relatively large surface area of the camming members 44 serves to distribute the force of their engagement over bulkhead panel surface 14, which is advantageous in the case of bulkhead panels 10 formed of relatively thin sheet metal. Concurrently with the rotation of retainer 38 and the compression of gasket 32, the edge 50 of body portion 42, by virtue of its location described above, begins to engage wire bundle 18. As it engages wire bundle 18, edge 50 pushes it upwardly and supports it, which is sometimes referred to as "dressing" the wire bundle. Importantly, it will be noted that retainer 38 is sized so that it remains substantially within the attachment envelope E as it rotates.

Still referring to FIGS. 6 and 7, the counterclockwise rotation of retainer 38 continues from the FIG. 6 position until base 40 engages bulkhead panel surface 14, as seen in FIG. 7. Thus, retainer base 40 acts as a stop portion and defines what may be called an operative rotated position of retainer 38. At the operative position, flexible hook 54 snaps through window 52, which it has done as shown in FIG. 7. Retainer 38 is thus maintained locked in the operative position. Once retainer 38 is locked in the operative position, the grommet body stop flange 30 is maintained tightly engaged with bulkhead panel surface 12, although that engagement is indirectly made through the now fully compressed resilient gasket 32. Also, at the operative position, the retainer base 40 is maintained tightly engaged with the opposed bulkhead panel surface 14. Grommet assembly 20 is, therefore, effectively attached to bulkhead panel 10, and its attachment has been achieved by working substantially within the limited access space of the attachment envelope E. Furthermore, locking retainer 38 at the operative position maintains the seal of the compressed gasket 32. In addition, the edge 50 of retainer body portion 42 is maintained in supporting engagement with the now fully upwardly dressed wire bundle 18.

It will be understood that variations of the preferred embodiment disclosed may be made within the spirit of the invention. Resilient gasket 32 is not strictly necessary to the attachment of grommet assembly 20, although it is desirable for practical reasons, and its compression is cooperatively and conveniently provided by the rotation of retainer 38. By the same token, the edge 50 of retainer body portion 42 could be cut back farther, so that it never engaged or supported wire bundle 18, although that support is also practically desirable, and is also cooperatively and conveniently provided by the same rotation of retainer 38. Therefore, it will be understood that the invention is capable of being embodied in other structures, and is not intended to be limited to the preferred embodiment disclosed.

The embodiments of the invention in which an exclusive property or privilege is claimed are defined as follows:

1. A grommet assembly for passing a wire bundle through an aperture in a panel having opposed surfaces, said assembly being attachable to said panel within a limited access space around said aperture, comprising, a grommet body having a passage through which a wire bundle may extend, said grommet body also having a stop portion that is engageable with one surface of said panel when said grommet body is placed in an attachment position overlying said aperture with said wire bundle passing through said aperture, said grommet body having a periphery defining, when in said attachment position, an attachment envelope within said limited access space, a pivot support extending from said grommet body and offset to one side thereof while still being able to pass through said aperture as said grommet body is placed in said attachment position, a retainer including at least one pivot member by which said retainer may be pivotally joined to said pivot support when said grommet body is in said attachment position so as to be rotatable toward said grommet body, said retainer further including a stop portion that is engageable with said panel other surface as said retainer rotates to an operative position, said retainer further being sized so as to remain substantially within said attachment envelope as said retainer rotates to said operative position, and locking means maintaining said retainer at said operative rotated position with said grommet body and said retainer stop portion engaged with their respective panel surfaces, whereby said grommet assembly is attached to said panel within said limited access space.

2. A grommet assembly for passing a wire bundle through an aperture in a panel having opposed surfaces, said assembly being attachable to said panel within a limited access space around said aperture, comprising, a grommet body having a passage through which a wire bundle may extend, said grommet body also having a stop portion that is engageable with one surface of said panel when said grommet body is placed in an attachment position overlying said aperture with said wire bundle by passing through said aperture, said grommet body having a periphery defining, when in said attachment position, an attachment envelope within said limited access space, a pivot support including a pair of spaced legs extending from said grommet body and offset to one side thereof while still being able to pass through said aperture as said grommet body is placed in said attachment position with said wire bundle passing between said spaced legs, a retainer including a pair of spaced pivot members by which said retainer may be pivotally joined to spaced legs when said grommet body is in said attachment position so as to be rotatable toward said grommet body, said retainer further including a stop portion that is engageable with said panel other surface as said retainer rotates to an operative position, said retainer also including a support member extending between said spaced pivot members and located so as to supportingly engage said wire bundle as said retainer rotates to said operative position, said retainer further being sized so as to remain substantially within said attachment envelope as said retainer rotates to said operative position, and, locking means maintaining said retainer at said operative rotated position with said grommet body and said retainer stop portion engaged with their respective panel surfaces, whereby said grommet assembly is attached to said panel within said limited access space with said support member maintained in supporting engagement with said wire bundle.

3. A grommet assembly for passing a wire bundle through an aperture in a panel having opposed surfaces, said assembly being attachable to said panel within a limited access space around said aperture, comprising, a grommet body having a passage through which a wire bundle may extend, said grommet body also having a peripheral stop flange that is engageable with one surface of said panel around said aperture when said grommet body is placed in an attachment position overlying said aperture with said wire bundle passing through said aperture, said stop flange further defining, when said grommet body is in said attachment position, an attachment envelope within said limited access space, a pivot support extending from said grommet body and offset to one side thereof while still being able to pass through said aperture as said grommet body is placed in said attachment position, said pivot support further including a surface facing said panel other surface, a retainer including a pivot member engageable with said pivot support surface to pivotally join said retainer to said pivot support when said grommet body is in said attachment position so as to be rotatable toward said grommet body, said retainer further including a stop portion that is engageable with said panel other surface as said retainer rotates to an operative position, said retainer further being sized so as to remain substantially within said attachment envelope as said retainer rotates to said operative position, a camming member on said retainer cammingly engageable with said panel other surface as said retainer rotates to said operative position to bias said retainer pivot member against said pivot support surface so as to force said grommet body stop flange and said retainer stop portion toward one another, a resilient gasket located between said grommet body stop flange and said panel one surface so as to be compressed against said panel one surface by said grommet body stop flange as said retainer rotates to said operative position and said camming member forces said grommet body stop flange and retainer stop portion toward one another, thereby providing a seal between said grommet body and said aperture, and, locking means maintaining said retainer at said operative rotated position with said grommet body stop flange and said retainer stop portion engaged with their respective panel surfaces, whereby said grommet assembly is attached to said panel within said limited access space with said compressed resilient gasket seal maintained.

* * * * *